United States Patent
Mukaiyama (10) Patent No.: US 7,142,130 B2
(45) Date of Patent: Nov. 28, 2006

(54) DRIVING SUPPORT SYSTEM FOR VEHICLE, DRIVING SUPPORT APPARATUS FOR VEHICLE, AND DRIVING SUPPORT METHOD FOR VEHICLE

(75) Inventor: Yoshio Mukaiyama, Mishima (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 277 days.

(21) Appl. No.: 10/730,058

(22) Filed: Dec. 9, 2003

(65) Prior Publication Data

US 2004/0119818 A1 Jun. 24, 2004

(30) Foreign Application Priority Data

Dec. 18, 2002 (JP) ............... 2002-367060

(51) Int. Cl.
*G08G 1/017* (2006.01)
(52) U.S. Cl. ............... 340/937; 340/901; 340/435; 701/302
(58) Field of Classification Search ................ 340/961
See application file for complete search history.

(56) References Cited

U.S. PATENT DOCUMENTS

| | | | |
|---|---|---|---|
| 5,907,293 A | 5/1999 | Tognazzini | |
| 6,075,559 A * | 6/2000 | Harada | 348/148 |
| 6,252,519 B1 * | 6/2001 | McKenna | 340/902 |
| 6,326,903 B1 | 12/2001 | Gross | |
| 6,327,536 B1 * | 12/2001 | Tsuji et al. | 340/901 |
| 6,445,308 B1 * | 9/2002 | Koike | 340/902 |
| 6,609,066 B1 * | 8/2003 | Miller et al. | 340/902 |
| 6,615,137 B1 * | 9/2003 | Lutter et al. | 340/436 |
| 6,684,149 B1 * | 1/2004 | Nakamura et al. | 340/903 |
| 6,791,471 B1 * | 9/2004 | Wehner et al. | 340/903 |
| 6,831,572 B1 * | 12/2004 | Strumolo et al. | 340/903 |
| 2001/0038344 A1 * | 11/2001 | Garcia | 340/902 |

FOREIGN PATENT DOCUMENTS

| | | |
|---|---|---|
| JP | A 4-290200 | 10/1992 |
| JP | A 5-266399 | 10/1993 |
| JP | A 6-150196 | 5/1994 |
| JP | A 7-311896 | 11/1995 |
| JP | A 9-91595 | 4/1997 |
| JP | A 10-260050 | 9/1998 |
| JP | A 10-307032 | 11/1998 |
| JP | A 10-320690 | 12/1998 |
| JP | A 11-348647 | 12/1999 |
| JP | A 2000-62553 | 2/2000 |
| JP | A 2000-259998 | 9/2000 |
| JP | A 2000-269886 | 9/2000 |
| JP | A 2001-202598 | 7/2001 |
| JP | A 2002-99989 | 4/2002 |
| JP | A 2002-104131 | 4/2002 |
| KR | 2002-0015135 | 2/2002 |

\* cited by examiner

*Primary Examiner*—Daniel Wu
*Assistant Examiner*—Eric M. Blount
(74) *Attorney, Agent, or Firm*—Kenyon & Kenyon LLP

(57) ABSTRACT

In a driving support system for a vehicle for determining the possibility that an estimated running vector of a moving object will intersect with an estimated running vector of a host vehicle using mobile communication, the possibility is three-dimensionally determined based on information obtained through mobile communication and image information on an area ahead of the host vehicle, which is obtained by image capturing means mounted on the vehicle.

14 Claims, 5 Drawing Sheets

| TIME | POSITIONS OF VEHICLES | JUDGED DANGER LEVELS | |
| --- | --- | --- | --- |
| | | WITHOUT ESTIMATION | WITH ESTIMATION |
| t1 | $A_1-B_1$ | 1 | 1 |
| t2 | $A_2-B_2$ | 2 | 2 |
| t3 | $A_3-B_3$ | 5 | 2 |
| t4 | $A_4-B_4$ | 1 | 1 |
| t5 | $A_5-B_5$ | 0 | 2 |
| t6 | $A_6-B_6$ | 4 | 5 |

# DRIVING SUPPORT SYSTEM FOR VEHICLE, DRIVING SUPPORT APPARATUS FOR VEHICLE, AND DRIVING SUPPORT METHOD FOR VEHICLE

INCORPORATION BY REFERENCE

The disclosure of Japanese Patent Application No. 2002-367060 filed on Dec. 18, 2002 including the specification, drawings and abstract is incorporated herein by reference in its entirety.

BACKGROUND OF THE INVENTION

1. Field of the Invention

The invention relates to a driving support system for a vehicle, a driving support apparatus for a vehicle, and a driving support method for a vehicle, for determining the possibility that an estimated running vector of a moving object will intersect with an estimated running vector of a host vehicle using mobile communication. More particularly, the invention relates to a driving support system for a vehicle, a driving support apparatus for a vehicle, and a driving support method for a vehicle, for three-dimensionally determining the possibility that an estimated running vector of a moving object will intersect with an estimated running vector of a host vehicle using image capturing means such as a camera.

2. Description of the Related Art

For example, in order to avoid a front-to-front collision, in a driving support apparatus for a vehicle or a driving support system for a vehicle, the possibility that an estimated running vector of a moving object will intersect with an estimated running vector of a host vehicle is determined using vehicle-to-vehicle communication for exchanging running data such as positional information and speed information between vehicles, as disclosed in Japanese Patent Laid-Open Publication No. 4-290200.

Also, it is conceivable that the possibility that an estimated running vector of a moving object will intersect with the estimated running vector of the host vehicle is determined using mobile communication for exchanging information such as positional information between the moving objects, for example, a transmitter carried by a pedestrian.

However, in the above-mentioned driving support apparatus for a vehicle or driving support system for a vehicle, the possibility that the estimated running vector of the moving object will intersect with the estimated running vector of the host vehicle can be determined only two-dimensionally. Accordingly, there is a possibility that an unnecessary warning is given to a driver of the vehicle.

For example, when the determination is made two-dimensionally, it is determined that even an estimated running vector of a pedestrian who is walking on a pedestrian over pass ahead of the host vehicle, an estimated running vector of a vehicle which is running on a road that overpasses or underpasses the road on which the host vehicle is running, or an estimated running vector of a vehicle which is running on an elevated highway that is located over the road on which the host vehicle is running will intersect with the estimated running vector of the host vehicle. In such a case, although there is no possibility that the estimated running vector of the moving object will intersect with the estimated running vector of the host vehicle in actuality, it is determined that there is a danger of collision.

SUMMARY OF THE INVENTION

It is an object of the invention to provide a driving support system for a vehicle, a driving support apparatus for a vehicle and a driving support method for a vehicle, for three-dimensionally determining the possibility that an estimated running vector of a moving object will intersect with an estimated running vector of a vehicle using an image of an area ahead of the vehicle, which is captured by a camera.

A driving support system for a vehicle according to a first aspect of the invention includes a vehicle which is provided with an image capturing portion for obtaining image information on an area ahead of the vehicle; and a moving object which can communicate with the vehicle through mobile communication. The vehicle three-dimensionally determines the possibility that an estimated running vector of the moving object will intersect with an estimated running vector of the vehicle based on the information obtained from the moving object through mobile communication and the image information. The possibility that the estimated running vector of the moving object will intersect with the estimated running vector of the vehicle is three-dimensionally determined based on the information obtained from the moving object through mobile communication and the image information. Examples of "moving object" are a vehicle, a pedestrian, a bicycle, and a wheelchair. Also, the expression "to determine three-dimensionally" signifies "to spatially determine the possibility that a moving vector of each moving object will intersect with a running vector of the vehicle, in consideration of an altitude of each moving object, for example, a distance between the ground surface and the moving object".

According to the first aspect, it is possible to recognize the presence of a pedestrian overpass, a road that overpasses or underpasses the road on which the vehicle is running, or a highway based on the image information on the area ahead of the vehicle. Therefore, it is possible to reduce generation of unnecessary warnings concerning the pedestrian who is walking on the pedestrian over pass, the vehicle which is running on the road that overpasses or underpasses the road on which the vehicle is running, or the vehicle which is running on the highway. In the aspect, in order to enhance the accuracy of determination when the presence of the pedestrian over pass, the road that overpasses or underpasses the road on which the vehicle is running, or the highway is recognized ahead of the vehicle, it is preferable that the information exchanged through mobile communication include information on the type of the moving object.

In the first aspect, the information exchanged through mobile communication may include positional information on the moving object, and the positional information may be two-dimensional information.

In the first aspect, the information exchanged through mobile communication may include the information on the type of the moving object.

In the first aspect, the vehicle may set a danger level concerning the moving object, depending on the type of the moving object.

A driving support system according to a second aspect of the invention includes a moving object which transmits information including altitude information through mobile communication; and a first vehicle which receives the altitude information transmitted from the moving object. The first vehicle three-dimensionally determines the possibility that an estimated running vector of the moving object will intersect with an estimated running vector of the first vehicle using the altitude information.

In the second aspect, the moving object may include an image capturing portion for capturing an image of an area ahead of the moving object, and the first vehicle may determine the possibility that the estimated running vector of the moving object will intersect with the estimated running vector of the first vehicle by spatially obtaining a road state near the moving object based on the image information transmitted from the moving object.

In the second aspect, the moving object may include a device for detecting altitude information such that the first vehicle can determine the possibility that the estimated running vector of the moving object will intersect with the estimated running vector of the first vehicle based on the altitude information transmitted from the moving object.

In the second aspect, the moving object may be a second vehicle, and the second vehicle may obtain the altitude information from an infrastructure side through road-to-vehicle communication, and determine the possibility that the estimated running vector of the moving object will intersect with the estimated running vector of the first vehicle based on the altitude information.

A driving support system for a vehicle according to a third aspect of the invention includes an image capturing portion which is provided in a vehicle and which obtains image information on an area ahead of the vehicle; a transmission portion which is provided in a moving object that is different from the above-mentioned vehicle, and which transmits information on the moving object; a reception portion which is provided in the vehicle and which receives the information transmitted from the moving object; and a determination portion which is provided in the vehicle and which determines the possibility that an estimated running vector of the moving object will intersect with an estimated running vector of the vehicle based on the information transmitted from the moving object and the image information obtained by the image capturing portion.

A driving support system for a vehicle according to a fourth aspect of the invention includes a transmission portion which is provided in a moving object and which transmits altitude information on the moving object; a reception portion which is provided in a vehicle and which receives the altitude information transmitted from the transmission portion; and a determination portion which is provided in the vehicle and which three-dimensionally determines the possibility that an estimated running vector of the moving object will intersect with an estimated running vector of the vehicle using the altitude information.

A driving support apparatus for a vehicle according to a fifth aspect of the invention includes an image capturing portion which captures an image of an area ahead of a vehicle and which obtains image information; and a determination portion which three-dimensionally determines the possibility that an estimated running vector of a moving object will intersect with an estimated running vector of the vehicle based on information on a moving object which is different from the vehicle, that is obtained through mobile communication, and the image information on the area ahead of the vehicle, that is obtained by the image capturing portion.

In the fifth aspect, the determination portion may include a judgement portion which two-dimensionally determines the possibility that the estimated running vector of the moving object will intersect with the estimated running vector of the vehicle based on the information obtained through mobile communication, and which judges a danger level into which the two-dimensional intersecting possibility is classified among predetermined danger levels; and a correction portion which corrects the judgement result obtained by the judgement portion using the image information on the area ahead of the vehicle.

In the fifth aspect, the correction portion may perform correction only when a road that overpasses or underpasses the road on which the vehicle is running, or a highway is recognized ahead of the vehicle by the image capturing portion, and also it is determined that there is no road which two-dimensionally intersects with the road on which the vehicle is running.

In the fifth aspect, the driving support apparatus for a vehicle may further include an information providing portion which provides the driver with at least one of information and a warning concerning presence of the moving object whose estimated running vector will intersect with the estimated running vector of the vehicle.

In the fifth aspect, the information providing portion may raise the degree of importance and urgency of the at least one of the information and the warning to be provided to the driver such that as the level of the danger rises, the degree of attracting attention of the driver rises.

A driving support method according to a sixth aspect of the invention includes a first step of capturing an image of an area ahead of the vehicle and obtaining image information; and a second step of three-dimensionally determining the possibility that an estimated running vector of a moving object will intersect with an estimated running vector of the vehicle based on information obtained through mobile communication and the image information.

In the sixth aspect, the second step may include a third step of two-dimensionally determining the possibility that the estimated running vector of the moving object will intersect with the estimated running vector of the vehicle based on the information obtained through mobile communication, and of judging a danger level into which the two-dimensional intersecting possibility is classified among predetermined danger levels; and a fourth step of correcting the judgement result using the image information.

In the sixth aspect, in the fourth step, correction may be performed only when a road that overpasses or underpasses the road on which the vehicle is running, or a highway is recognized ahead of the vehicle, and also it is determined that there is no road which two-dimensionally intersects with the road on which the vehicle is running.

Another aspect of the invention relates to an in-vehicle apparatus (a driving support apparatus for a vehicle) used in the driving support system for a vehicle.

In any of the above-mentioned aspects, information transmission through mobile communication may be performed by unicasting, multicasting or broadcasting. Also, the number of the moving objects is not limited to one. There may be plural moving objects.

BRIEF DESCRIPTION OF THE DRAWINGS

The forgoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Hereafter, an embodiment of the invention will be described with reference to accompanying drawings.

Figure 1:
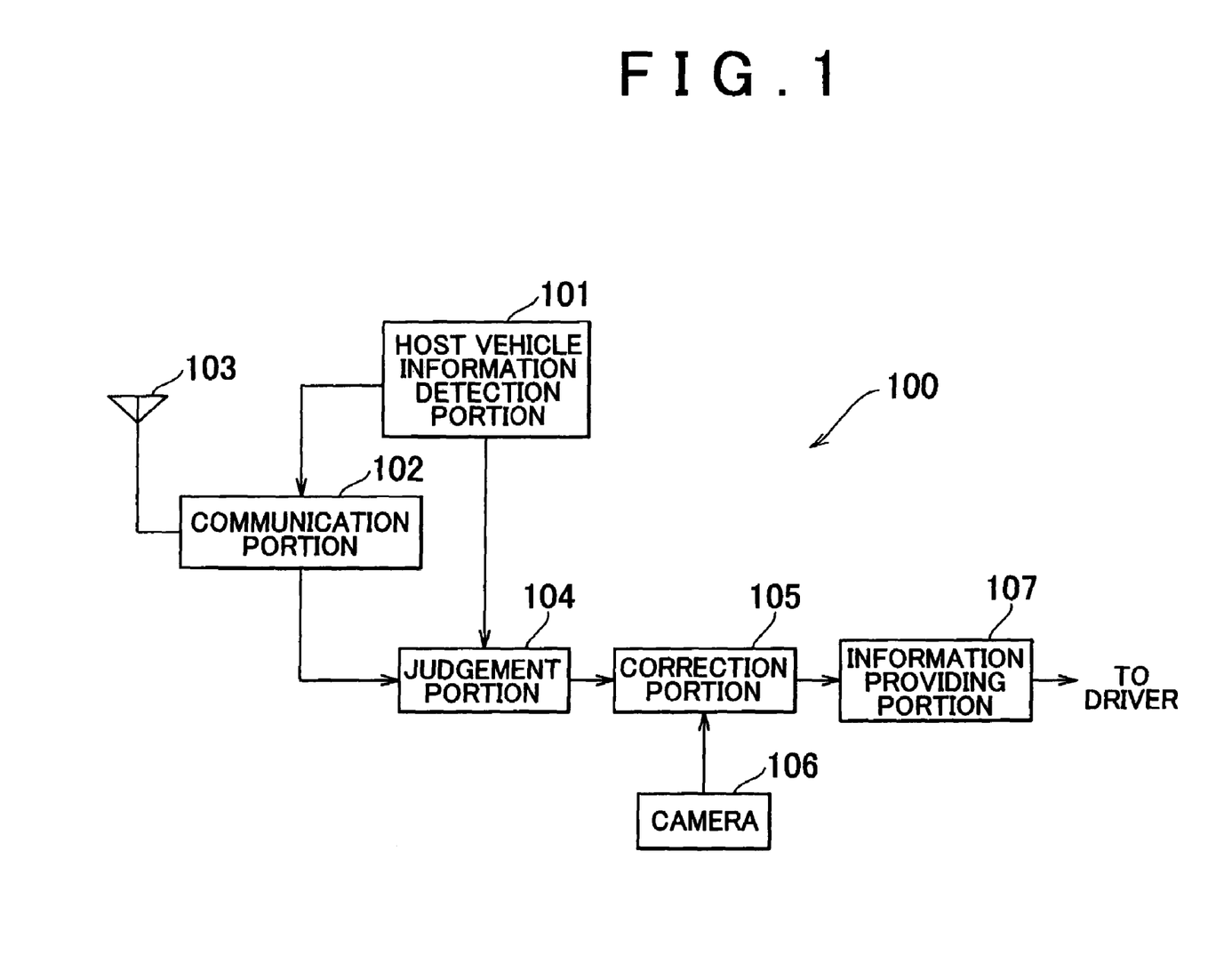
FIG. 1 is a functional block diagram of a driving support apparatus according to an embodiment of the invention.

First, the configuration of a driving support apparatus mounted on a vehicle in the embodiment will be described with reference to FIG. 1. FIG. 1 is a functional block diagram of a driving support apparatus 100 according to the embodiment.

The driving support apparatus 100 for a vehicle according to the embodiment may be mounted on a vehicle during assembly of the vehicle, or may be mounted on the vehicle after assembly of the vehicle. Also, the driving support apparatus 100 for a vehicle may be mounted on the vehicle so as to be removable.

The driving support apparatus 100 includes a host vehicle information detection portion 101 which detects information on the host vehicle (hereinafter, referred to as "vehicle information"). Examples of the vehicle information are positional information, speed information, rudder angle information, yaw rate information and Gxy sensor information. In the embodiment, a detection method employed in the host vehicle information detection portion 101 may be arbitrary.

The vehicle information detected by the host vehicle information detection portion 101 is transmitted by a communication portion 102 through an antenna 103. The transmission may be performed by unicasting, multicasting or broadcasting. When the vehicle information includes plural items, the items may be combined and transmitted simultaneously, or may be transmitted as different data at different timings.

The driving support apparatus 100 further includes a judgement portion 104 which prepares a running vector of a vehicle that has transmitted a signal based on the vehicle information (at least the positional information) received from another vehicle through the antenna 103 and the communication portion 102, and which judges a danger level concerning the possibility that the estimated running vector of the other vehicle will intersect with the estimated running vector of the host vehicle. In this case, a running vector of a vehicle is a bound vector (a physical vector whose starting point is designated) whose starting point is the position of the vehicle and whose length is the speed of the vehicle. The process performed by the judgement portion 104 will be described later in detail.

The driving support apparatus 100 further includes a correction portion 105 which corrects the judgement result obtained by the judgement portion 104 based on the image information on the area ahead of the host vehicle, that is obtained by a camera 106 for capturing the image of the area ahead of the host vehicle. The process performed by the correction portion 105 will be described later in detail.

The driving support apparatus 100 further includes an information providing portion 107 which provides the driver with information and/or a warning concerning the presence of another vehicle whose estimated running vector will intersect with the estimated running vector of the host vehicle.

The information and/or the warning may be visually provided on a display of a navigation system or an instrument panel, may be visually provided on a front window as a hologram virtual image, may be acoustically provided from a speaker by voice, or may be provided in combination of these methods.

The concrete contents of the information and/or the warning to be provided and the timing of provision may be arbitrary.

Figure 2:
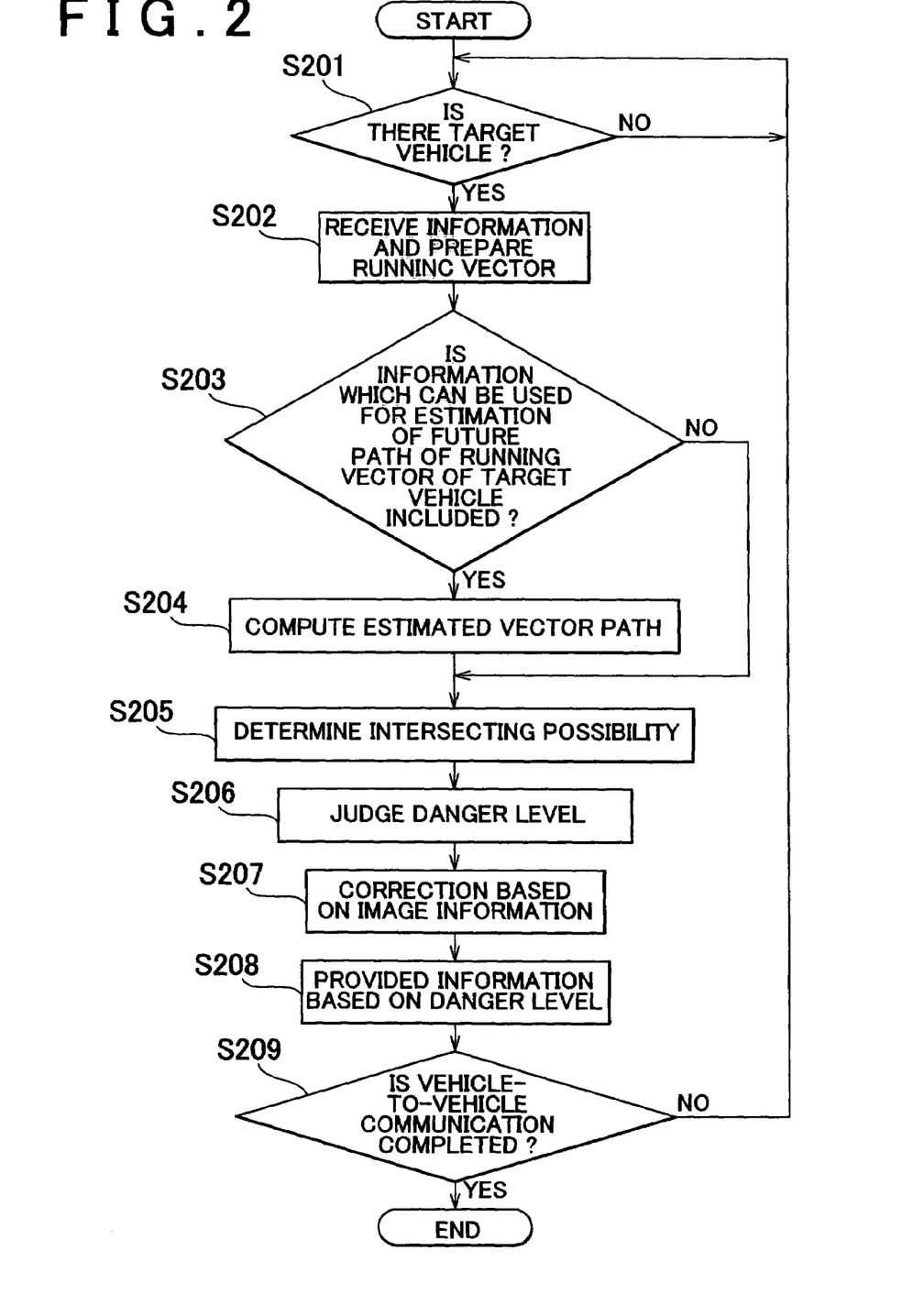
FIG. 2 is a flowchart showing a process performed by the driving support apparatus according to the embodiment of the invention.

Hereafter, operation of the driving support apparatus 100 according to the embodiment will be described with reference to FIG. 2. Particularly, the danger level judging process performed by the judgement portion 104 and the judgement result correcting process performed by the correction portion 105 will be described in detail. FIG. 2 is a flowchart showing the process performed by the driving support apparatus 100 according to the embodiment.

First, the judgement portion 104 searches the information transmitted from the other vehicles, and determines whether there is a vehicle whose estimated running vector will intersect with the estimated running vector of the host vehicle (hereinafter, referred to as a "target vehicle") (S201). When it is determined that there is a target vehicle ("YES" in S201), the vehicle information (at least positional information) transmitted from the target vehicle is received, and the running vector of the target vehicle is prepared (S202).

The speed information (the length of the vector) and the moving direction information (the direction of the vector), which are necessary for preparing the running vector, can be obtained by monitoring the positional information. Accordingly, as the vehicle information, at least positional information on the target vehicle needs to be received. Namely, the host vehicle information detection portion 101 of the target vehicle needs to detect at least the positional information on the target vehicle itself. When the vehicle information received from the target vehicle includes the speed information and/or the moving direction information, it is not necessary to monitor the positional information, and the vehicle information can be used as it is.

Next, the judgement portion 104 judges whether the vehicle information received from the target vehicle includes information which can be used for estimating a future path of the running vector of the target vehicle (S203). Examples of the information which can be used for the estimation are rudder angle information, yaw rate information and Gxy information.

When the vehicle information includes such information ("YES" in S203), the future vector path of the running vector of the target vehicle, that is prepared in S202, is computed using the information (S204).

Next, the judgement portion 104 determines the possibility that the estimated vector path of the target vehicle, which is computed in S204 (in the case of "YES" in S203), or the running vector prepared in S202 (in the case of "NO" in S203) will intersect with the running vector of the host vehicle, which is prepared based on the vehicle information obtained by the host vehicle information detection portion 101 (S205), and judges the danger level to which the intersecting possibility corresponds among the predetermined danger levels (S206).

Figure 3:
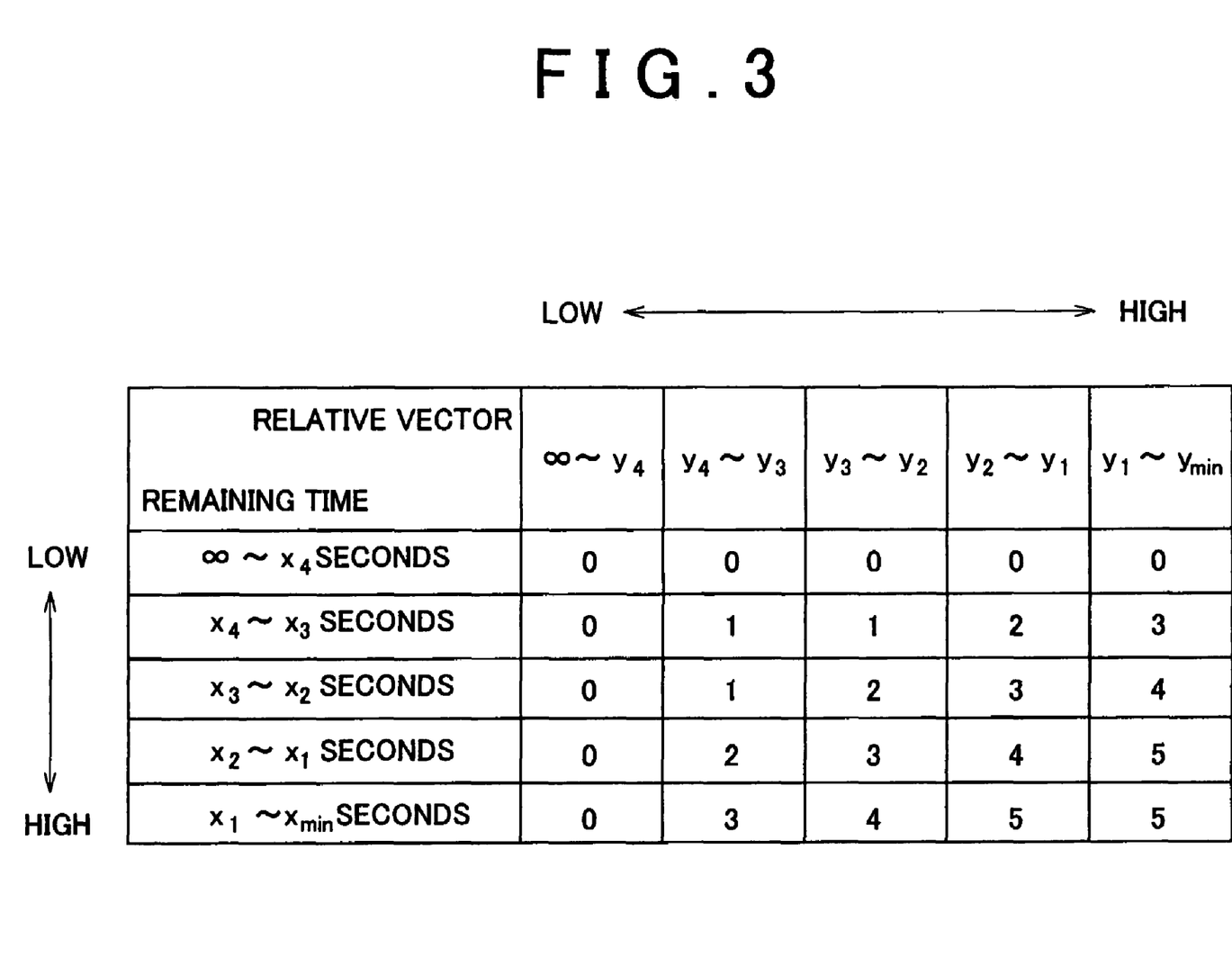
FIG. 3 is a table showing an example of danger levels.

FIG. 3 shows an example of the danger levels. In this table, the danger levels are ranked on a scale of 0 to 5. To which level the possibility corresponds is determined based on a relative vector of the two vectors and the remaining time until the two vectors intersect with each other. In this case, the index showing the distance when the host vehicle and the target vehicle approach each other at the maximum level, which is estimated in consideration of the vector amounts (speed and direction) of the two vectors is called a "relative vector". Namely, the relative vector thus defined shows the distance between the host vehicle and the target vehicle when the distance between the two vehicles at the same timing becomes the minimum level. Accordingly, it is determined that the larger the relative vector is, the lower the possibility that the two vehicles come into collision is. Meanwhile, it is determined that the smaller the relative vector is, the higher the possibility that the two vehicles come into collision is. Also, the "remaining time" is an index showing the time remaining until the two vehicles approach each other at the maximum level. When the remaining time is short, it is determined that the possibility that the two vehicles come into collision is high. On the other hand, when the remaining time is long, it is determined that the possibility that the two vehicles come into collision is low.

Accordingly, in the example shown in FIG. 3, the danger level is set to rise as the relative vector becomes smaller and the remaining time becomes shorter. When the relative vector is considerably large (for example, when the two vectors are in the substantially opposite directions), the danger level is set to "0" regardless of length of the remaining time. Meanwhile, when the remaining time is considerably long, the danger level is set to "0" regardless of the amount of the relative vector.

Figure 4:
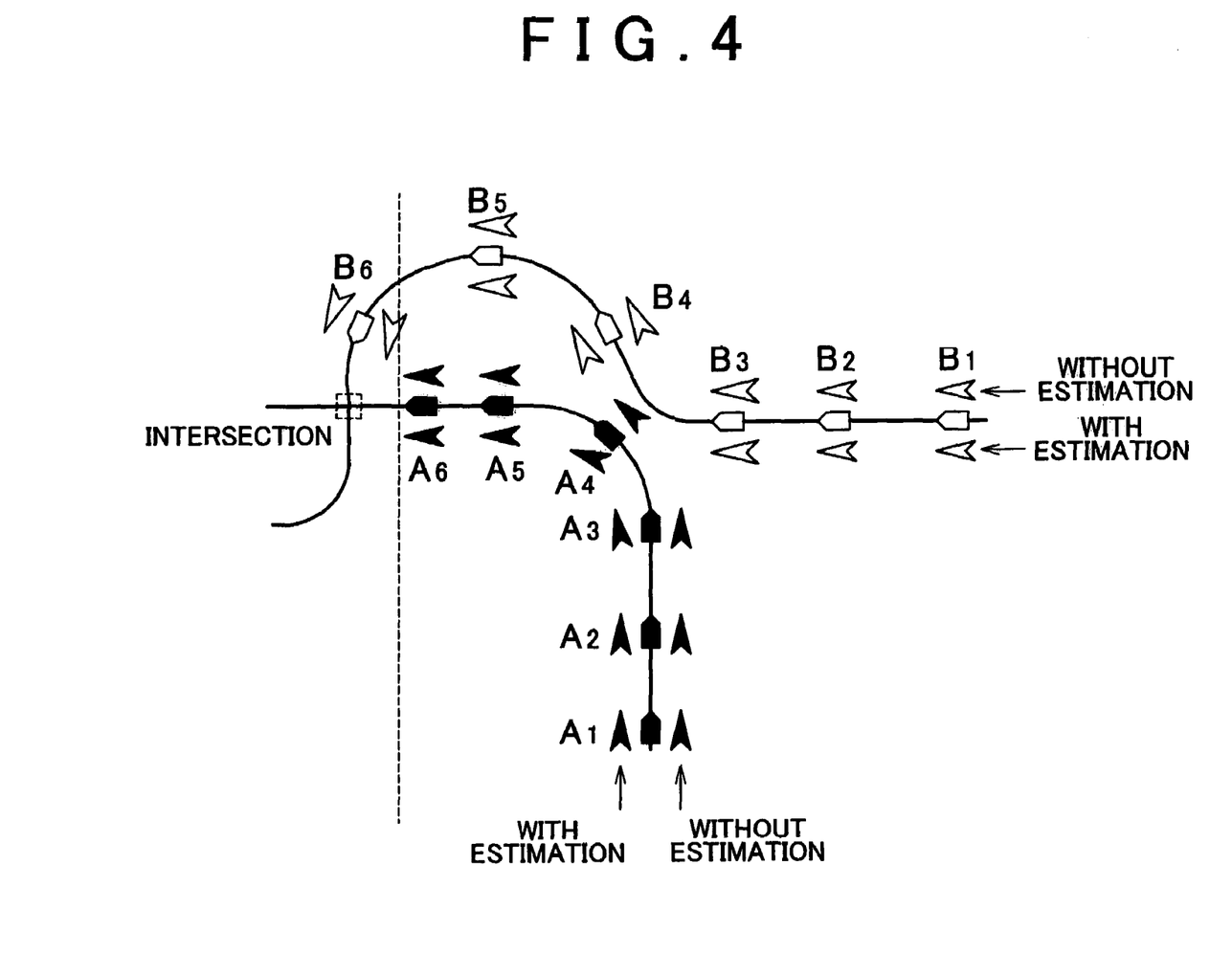
FIG. 4 is a view showing an example of running vectors of a host vehicle and a target vehicle.

Next, a concrete example of the danger level judgement (S206 in FIG. 2) using the example of the danger levels shown in FIG. 3 will be described with reference to FIGS. 4 and 5. FIG. 4 shows an example of the running vectors of the host vehicle (A) and the target vehicle (B). In FIG. 4, a solid line shows a road, a pentagon shows a position of a vehicle, and an arrowhead shows an image of a vector amount of a running vector of the vehicle. In this case, the host vehicle A determines the danger level concerning the other vehicle (i.e., the target vehicle) whose estimated running vector will intersect with the estimated running vector of the host vehicle A. Subscripts of A or B show flow of time. The subscripts having the same number show the same time. The figure shows both the image of the vector amount in each vehicle when the estimation of the future vector path (S204 in FIG. 2) is performed, and the image of the vector amount in each vehicle when the estimation of the future vector path is not performed.

Figure 5:
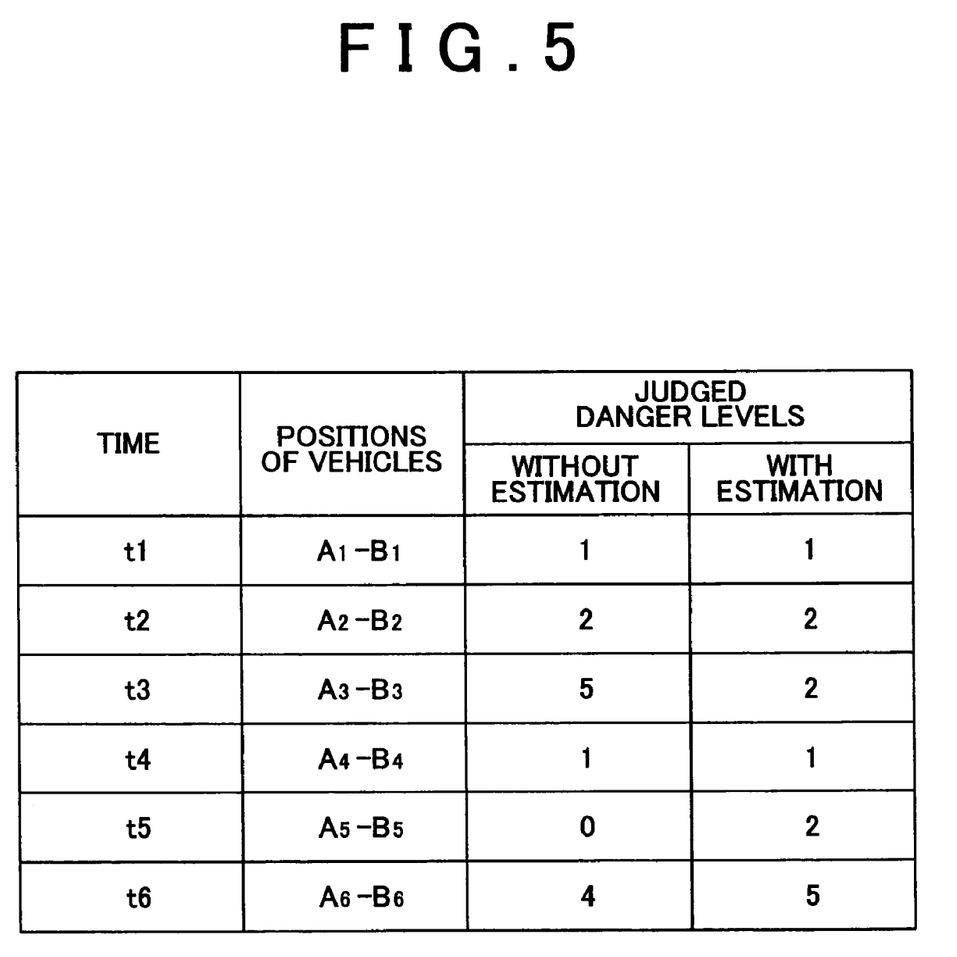
FIG. 5 is a table showing an example of judgement of danger level.

FIG. 5 shows the danger levels determined at times t1 to t6. At time t1, the vector of the host vehicle A and the vector of the target vehicle B are in the directions substantially perpendicular to each other, and it is judged that the danger level is "1". Also, since the two vehicle are running on the substantially straight roads, it is judged that the danger level is "1" regardless of the presence or absence of the estimated vector path.

At time t2, the two vehicles are running on the substantially straight roads, the judgement results are the same regardless of presence or absence of the estimation. However, the remaining time becomes shorter than that at time t1, the danger level is raised to "2".

At time t3, when estimation is not performed, the vectors of the two vehicle are in the directions substantially perpendicular to each other, and the remaining time becomes further shorter. Accordingly, it is judged that the danger level is "5" which shows the highest danger level. However, when estimation is performed, steering is performed such that the host vehicle A proceeds leftward and also steering is performed such that the target vehicle proceeds rightward. Therefore, since it is estimated that the two vehicles will proceed so as to move away from each other, it is judged that the danger level is "2" which is lower than that when estimation is not performed.

At time t4, although the distance between the two vehicles is short, the relative vector is large considering the directions of the two vectors. Accordingly, it is judged that the danger level is "1" regardless of presence or absence of estimation.

At time t5, when estimation is not performed, the two vectors are substantially parallel to each other. Accordingly, it is judged that the relative vector is infinite, and the danger level is "0". On the other hand, when estimation is performed, it is estimated that steering will be performed such that the target vehicle B proceeds leftward. Accordingly, it is judged that the danger level is "2".

At time t6, when estimation is performed, it is determined that the two vectors will be perpendicular to each other in a short time due to the steering of the target vehicle B, and the remaining time is short. Accordingly, it is judged that the danger level is "5" which shows the highest danger level. On the other hand, when estimation is not performed, since the target vehicle B is still running on a curve, the vector of the target vehicle B is directed the outside of the curve. Therefore, it is judged that the remaining time is long compared with the case where estimation is performed, and the danger level is "4" which is one level lower than that when estimation is performed.

Even when estimation is not performed, it is possible to determine the possibility that the estimated running vector of the target vehicle will intersect with the estimated running vector of the subject vehicle. However, it is preferable to use the estimated vector paths, since the accuracy increases. When the vehicle information on the target vehicle is newly received during the computation of the estimated vector path (S204) or judgement of the danger level (S206), it is possible to re-perform the computation and/or the judgement based on the newest information after updating the vehicle information.

FIG. 2 will be described again. The correction portion 105 corrects the thereby judged danger level, based on the image information on the area ahead of the host vehicle, which is obtained by the camera 106 (S207). More particularly, when a road that overpasses or underpasses the road on which the host vehicle is running, or a highway is recognized ahead of the host vehicle, the correction portion 105 determines that the target vehicle may be running on the road that overpasses or underpasses the road on which the host vehicle is running, or on the highway, and the possibility that the estimated running vector of the target vehicle will intersect with the estimated running vector of the host vehicle may be substantially "0". Then, the correction portions 105 performs a correction for lowering the danger level by one level. Depending on the image capturing ability and/or the image analyzing ability of the camera 106, setting may be performed such that correction is performed only when the road that overpasses or underpasses the road on which the host vehicle is running, or the highway is recognized ahead of the host vehicle and also it is determined that there is no road which two-dimensionally intersects with the road on which the host vehicle is running.

Next, the information providing portion 107 provides the driver with information based on the danger level which is corrected by the correction portion 105 if necessary (S208). The timing at which the information is provided may be set arbitrarily For example, the timing may be set such that the information is provided 150 meters before the intersection. Also, the concrete contents of the information and the method of provision are arbitrary.

In any of the above-mentioned cases, it is preferable that phased information contents and information providing method be set such that as the danger level rises, the degree of attracting attention of the driver rises. For example, when the danger level is "0", no information is provided. As the danger level rises from "1" to "5", the information contents and information providing method change. The degree of importance and urgency of the information and the warning is raised as the danger level rises. In the beginning of the information provision, only the information that there is a vehicle whose estimated running vector will intersect with the estimated running vector of the host vehicle is provided. Then, the information that the driver should pay attention is provided. Then, a warning is issued. Finally, for example, when the danger level becomes "5", intervention to the control (for example, forcible braking and/or forcible steering) is performed. (figures and description concerning the configuration for performing the intervention are omitted.)

Due to the information provision, the driver can recognize the presence of the vehicle whose estimated running vector will intersect with the estimated running vector of the host vehicle in advance, even when the target vehicle is not in the sight of the driver. Therefore, the driver can take actions for avoiding a collision, such as steering and deceleration.

After the information provision, unless the vehicle-to-vehicle communication is no longer taking place due to, for example, the driver having turned off the power supply or the engine ("NO" in S209), the process returns to S201.

According to the embodiment, the possibility that the estimated running vector of the other vehicle will intersect with the estimated running vector of the host vehicle is determined in consideration of the image information on the area ahead of the host vehicle, which is captured by the camera, in addition to the vehicle information received from the other vehicle. Therefore, it is possible to three-dimensionally determine the possibility that the estimated running vector of the other vehicle will intersect with the estimated running vector of the host vehicle.

The determination of the danger level, which is described with reference to FIGS. 3 to 5, is only one example of the method for two-dimensionally determining the possibility that the estimated running vector of the other vehicle will intersect with the estimated running vector of the host vehicle. Various other methods can be employed. Only one example of the number of the danger levels and the classifying method is shown in FIG. 3.

In the invention, when the method of two-dimensionally determining the possibility that the estimated running vector of the other vehicle will intersect with the estimated running vector of the host vehicle and then correcting the result using the image information is employed, as in the case of the above-mentioned embodiment, the configuration and method for two-dimensionally determining the possibility that the estimated running vector of the other vehicle will intersect with the estimated running vector of the host vehicle are not limited. Two-dimensionally determining the possibility that the estimated running vector of the other vehicle will intersect with the estimated running vector of the host vehicle based on the relative vector and the remaining time, and using the danger levels are only examples employed in the embodiment, and are not essential elements of the invention.

As in the case of the embodiment, the aspect of two-dimensionally determining the possibility that the estimated running vector of the other vehicle will intersect with the estimated running vector of the host vehicle based on the received vehicle information, classifying the possibility into the danger levels, and correcting the result (danger level) using the image information is only one example for three-dimensionally determining the possibility that the estimated running vector of the other vehicle will intersect with the estimated running vector of the host vehicle. In the invention, it is possible to three-dimensionally determine the possibility that the estimated running vector of the other vehicle will intersect with the estimated running vector of the host vehicle using the received vehicle information on the other vehicle and the image information on the area ahead of the host vehicle in parallel from the beginning.

Also, the components shown in the functional block diagram in FIG. 1 and the other known components which are not shown in the figure may be realized by at least one piece of hardware, may be realized by software, or may be realized by the combination of at least one piece of hardware and software.

Also, in the above-mentioned embodiment, the driving support apparatus 100 may transmit the image information on the area ahead of the host vehicle, which is captured by the camera 106, as part of the vehicle information, using the communication portion 102 and the antenna 103. Thus, even a vehicle without a camera can spatially obtain the ambient road state based on the image information received from the other vehicle, and can three-dimensionally determine the possibility that the estimated running vector of the other vehicle will intersect with the estimated running vector of the host vehicle. In this case, when only a flag, which shows presence or absence of a road that overpasses or underpasses the road on which the host vehicle is running or a highway ahead of the host vehicle, is transmitted, it is possible to reduce the amount of data to be exchanged through communication.

In the above-mentioned embodiment, when each vehicle includes a device for detecting the altitude of the host vehicle, or when the vehicle can obtain the altitude of the present position of the host vehicle from the infrastructure side through road-to-vehicle communication, the vehicle may transmit the information on the altitude of the host vehicle as past of the vehicle information using the communication portion 102 and the antenna 103. Thus, even the vehicle without a camera can three-dimensionally determine the possibility that the estimated running vector of the other vehicle will intersect with the estimated running vector of the host vehicle based on the altitude information received from the other vehicle. For example, it can be determined that the other vehicle, which is positioned at an altitude that is upwardly or downwardly distant from the altitude of the host vehicle by equal to larger than the predetermined distance, is running on the road that overpasses or underpasses the road on which the host vehicle is running. In this case, an "altitude" signifies a distance between the ground surface and the host vehicle. However, the reference surface may be set arbitrarily. For example, a known index such as a height above the sea level may be used.

In the above-mentioned embodiment, description is mainly made on the case where the possibility that an estimated running vector of one other vehicle will intersect with the estimated running vector of one subject vehicle is three-dimensionally determined. However, according to the drawings and the description, the number of the vehicles which transmit the vehicle information may be plural. Also, the number of the vehicles which receive the vehicle information may be plural. The transmission and reception of the information can be performed individually and simultaneously. Therefore, by collecting the vehicle information from many vehicles near the host vehicle, it is possible to obtain more detailed information on the state near the host vehicle.

In the functional block diagram in FIG. 1, description is made on the driving support apparatus 100 including both a transmission system for transmitting the vehicle information on the host vehicle and a reception system for judging the danger level based on the vehicle information received from the other vehicle. However, in the driving support system according to the invention, there may exist a driving support apparatus having only the transmission system and a vehicle including the driving support apparatus having only the transmission system. Also, there may exist a driving support apparatus having only the reception system and a vehicle including the driving support apparatus having only the reception system.

The invention may be easily applied to a pedestrian, a person riding on a bicycle, a person on a wheelchair, or the like (hereinafter, referred to as "pedestrian or the like) who carries the transmitter having only the transmission system. Namely, the driving support apparatus for a vehicle can be applied to a method for receiving the information on the moving object (corresponding to the vehicle information) transmitted from the transmitter carried by the pedestrian or the like, and for three-dimensionally determining the possibility that the estimated running vector of the pedestrian or the like who has transmitted a signal will intersect with the estimated running vector of the host vehicle.

When the possibility that the estimated running vector of the moving object such as the pedestrian will intersect with the estimated running vector of the host vehicle is determined, the driving support apparatus for a vehicle is set to recognize not a road that overpasses or underpasses the road on which the host vehicle is running, and a highway but also a pedestrian over pass. When the information from moving objects other than a vehicle is also taken into consideration for determining the intersecting possibility, it is preferable that the information on the moving object which is transmitted from the moving object include the information on the type of the moving object which has transmitted the information (for example, the information whether the moving object is a vehicle, or a pedestrian). In this case, it is possible to perform the following process when the moving object recognized ahead of the host vehicle is a pedestrian or the like. In the process, the correction portion 105 lowers the danger level only when the object recognized ahead of the host vehicle is a pedestrian over pass, and does not lower the danger level when the object recognized ahead of the host vehicle is a road that overpasses or underpasses the road on which the host vehicle is running, or a highway. Therefore, the accuracy of determining the danger level is enhanced. (When the target moving object is a vehicle, the danger level is lowered only when the object recognized ahead of the host vehicle is a road that overpasses or underpasses the road on which the host vehicle is running, or a highway. When the object recognized ahead of the host vehicle is a pedestrian over pass, the danger level is not lowered.

As described so far, it is possible to provide a driving support system for a vehicle and a driving support apparatus for a vehicle for three-dimensionally determining the possibility that an estimated running vector of a moving object (another vehicle) will intersect with an estimated running vector of a host vehicle using image information on an area ahead of the host vehicle, that is captured by a camera.

It is to be noted that the expression "to three-dimensionally determine the possibility that an estimated running vector of a moving object will intersect with an estimated running vector of a host vehicle" signifies "to spatially determine whether a running vector of the moving object will actually intersect with a running vector of the host vehicle".

What is claimed is:

1. A driving support system for a vehicle, comprising:
   a vehicle which is provided with an image capturing portion that obtains image information on an area ahead of the vehicle; and
   a moving object which can communicate with the vehicle through mobile communication,
   wherein the vehicle two-dimensionally determines a possibility that an estimated running vector of the moving object will intersect with an estimated running vector of the vehicle based on the information obtained through mobile communication; and
   the vehicle corrects the two-dimensionally determined possibility when a road that overpasses or underpasses a road on which the vehicle is running is recognized ahead of the vehicle by the image capturing portion, and also it is determined that there is no road which two-dimensionally intersects with the road on which the vehicle is running.

2. The driving support system according to claim 1, wherein the information exchanged through mobile communication includes positional information on the moving object, and the positional information is two-dimensional information.

3. The driving support system according to claim 1, wherein the information exchanged through mobile communication includes information on a type of the moving object.

4. A driving support system for a vehicle, comprising:
   a vehicle which is provided with an image capturing portion that obtains image information on an area ahead of the vehicle;
   a moving object which can communicate with the vehicle through mobile communication, wherein the vehicle three-dimensionally determines a possibility that an estimated running vector of the moving object will intersect with an estimated running vector of the vehicle based on information obtained from the moving object through mobile communication and the image information,
   wherein the information exchanged through mobile communication includes information on a type of the moving object, and the vehicle sets a danger level concerning a collision between the moving object and the vehicle depending on the type of the moving object.

5. A driving support system for a vehicle, comprising:
   a moving object which transmits information on the moving object through mobile communication; and
   a first vehicle which receives the information transmitted from the moving object,
   wherein the moving object includes an image capturing portion that captures an image of an area ahead of the moving object, and transmits image information thereof to the first vehicle, and the first vehicle determines a possibility that an estimated running vector of the moving object will intersect with an estimated running vector of the first vehicle by spatially obtaining a road state near the moving object based on the image information transmitted from the moving object.

6. A driving support system for a vehicle, comprising:
   a moving object which transmits information including altitude information on the moving object through mobile communication; and a first vehicle which receives the altitude information transmitted from the moving object, wherein the first vehicle three-dimensionally determines a possibility that an estimated running vector of the moving object will intersect with an estimated running vector of the first vehicle using the altitude information, wherein the moving object includes a device that detects the altitude information and the first vehicle determines the possibility that the estimated running vector of the moving object will intersect with the estimated running vector of the first vehicle based on the altitude information transmitted from the moving object.

7. A driving support system for a vehicle, comprising:

a moving object which transmits information including altitude information on the moving object through mobile communication; and a first vehicle which receives the altitude information transmitted from the moving object, wherein the first vehicle three-dimensionally determines a possibility that an estimated running vector of the moving object will intersect with an estimated running vector of the first vehicle using the altitude information, wherein:

the moving object is a second vehicle, and the second vehicle obtains the altitude information from an infrastructure side through road-to-vehicle communication; and the first vehicle determines the possibility that the estimated running vector of the moving object will intersect with the estimated running vector of the first vehicle based on the altitude information.

8. A driving support system for a vehicle, comprising:

an image capturing portion which is provided in a vehicle and which obtains image information on an area ahead of the vehicle;

a transmission portion which is provided in a moving object that is different from the vehicle, and which transmits information on the moving object;

a reception portion which is provided in the vehicle and which receives the information transmitted from the moving object;

a determination portion which is provided in the vehicle and which two-dimensionally determines a possibility that an estimated running vector of the moving object will intersect with an estimated running vector of the vehicle based on the information transmitted from the moving object and the image information obtained by the image capturing portion; and the determination portion corrects the two-dimensionally determined possibility when a road that overpasses or underpasses a road on which the vehicle is running is recognized ahead of the vehicle by the image capturing portion, and also it is determined that there is no road which two-dimensionally intersects with the road on which the vehicle is running.

9. A driving support apparatus for a vehicle, comprising:

an image capturing portion which captures an image of an area ahead of a vehicle and which obtains image information on the area ahead of the vehicle; and a determination portion which three-dimensionally determines a possibility that an estimated running vector of a moving object will intersect with an estimated running vector of the vehicle based on information on the moving object, which is different from the vehicle, that is obtained through mobile communication, and the image information on the area ahead of the vehicle, that is obtained by the image capturing portion;

wherein the determination portion further includes a judgment portion which two-dimensionally determines the possibility that the estimated running vector of the moving object will intersect with the estimated running vector of the vehicle based on the information obtained through mobile communication, and which judges a danger level into which the possibility is classified among predetermined danger levels concerning a collision between the moving object and the vehicle; and a correction portion which corrects a result of the judgment obtained by the judgment portion using the image information on the area ahead of the vehicle.

10. The driving support apparatus according to claim 9, wherein the correction portion corrects the result of the judgment only when a road that overpasses or underpasses a road on which the vehicle is running, is recognized ahead of the vehicle by the image capturing portion, and also it is determined that there is no road which two-dimensionally intersects with the road on which the vehicle is running.

11. The driving support apparatus according to claim 9, further comprising, an information providing portion which provides a driver with at least one of information and a warning concerning presence of the moving object whose estimated running vector will intersect with the estimated running vector of the vehicle.

12. The driving support apparatus according to claim 11, wherein the information providing portion raises a degree of importance and urgency of at least one of the information and the warning to be provided to the driver such that as a danger level concerning a collision between the moving object and the vehicle rises, a degree of attracting attention of the driver rises.

13. A driving support method for a vehicle, comprising:

a first step of capturing an image of an area ahead of a vehicle and obtaining image information on the area ahead of the vehicle; and a second step of three-dimensionally determining a possibility that an estimated running vector of a moving object will intersect with an estimated running vector of the vehicle based on information obtained through mobile communication and the image information, wherein the second step includes a third step of two-dimensionally determining the possibility that the estimated running vector of the moving object will intersect with the estimated running vector of the vehicle based on the information obtained through mobile communication, and of judging a danger level into which the possibility is classified among predetermined danger levels and a fourth step of correcting a result of the judgment using the image information.

14. The driving support method according to claim 13, wherein, in the fourth step, correction is performed only when a road that overpasses or underpasses a road on which the vehicle is running is recognized ahead of the vehicle, and also it is determined that there is no road which two-dimensionally intersects with the road on which the vehicle is running.

* * * * *

UNITED STATES PATENT AND TRADEMARK OFFICE
CERTIFICATE OF CORRECTION

PATENT NO.         : 7,142,130 B2                                    Page 1 of 1
APPLICATION NO. : 10/730058
DATED                  : November 28, 2006
INVENTOR(S)         : Yoshio Mukaiyama It is certified that error appears in the above-identified patent and that said Letters Patent is hereby corrected as shown below:

On the Title Page, column 2 item 56 (cont'd. from col. 1 under "U.S. PATENT DOCUMENTS":

Line 1:   Change "6,609,066 B1" to --6,609,066 B2--.

Line 2:   Change "6,615,137 B1" to --6,615,137 B2--.

Line 3:   Change "6,684,149 B1" to --6,684,149 B2--.

Line 4:   Change "6,791,471 B1" to --6,791,471 B2--.

Line 5:   Change "6,831,572 B1" to --6,831,572 B2--.

Signed and Sealed this

Seventeenth Day of April, 2007

JON W. DUDAS
*Director of the United States Patent and Trademark Office*